Figure 2:
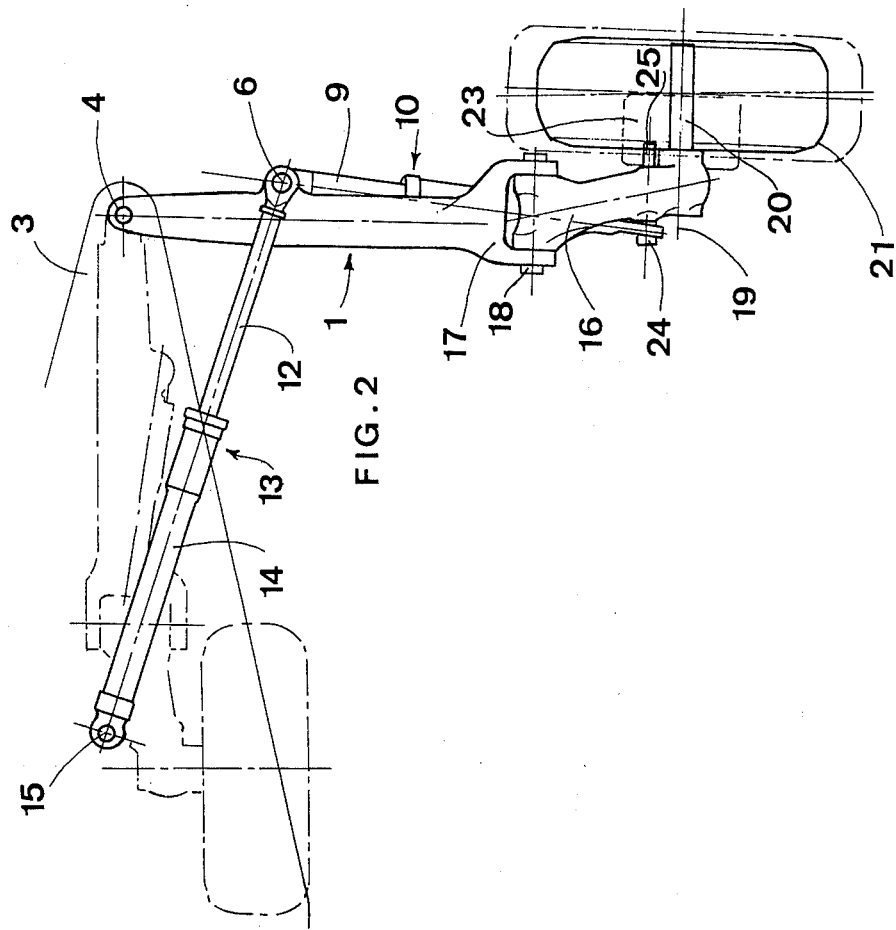

United States Patent [19]

Masclet et al.

[11] 4,312,485
[45] Jan. 26, 1982

[54] LANDING GEAR WITH SWING-BAR AND LATERAL LIFTING FOR AIRCRAFT

[75] Inventors: Jean Masclet, Paris; Andre Turiot, Morsang sur Orge, both of France

[73] Assignee: Messier-Hispano-Bugatti, Montrouge, France

[21] Appl. No.: 107,877

[22] Filed: Dec. 26, 1979

[30] Foreign Application Priority Data

Dec. 29, 1978 [FR] France .................... 78 36807

[51] Int. Cl.³ .................................. B64C 25/12
[52] U.S. Cl. .................................... 244/102 R
[58] Field of Search ......... 244/102 R, 100 R, 102 SS, 244/102 SL, 104 R, 104 FP

[56] References Cited

U.S. PATENT DOCUMENTS

| | | | |
|---|---|---|---|
| 2,974,909 | 3/1961 | Perdue | 244/102 R |
| 3,346,218 | 10/1967 | Lucien | 244/102 R |
| 3,899,147 | 8/1975 | Masclet et al. | 244/102 R |
| 4,147,316 | 4/1979 | Kendall et al. | 244/102 R |
| 4,199,119 | 4/1980 | Masclet | 244/102 R |

FOREIGN PATENT DOCUMENTS 543553  7/1957  Canada .................... 244/104 R

*Primary Examiner*—Galen L. Barefoot
*Attorney, Agent, or Firm*—McAulay, Fields, Fisher, Goldstein & Nissen

[57] ABSTRACT

A main landing gear with swing-bar and lateral lifting for aircraft. Two undercarriages are provided which are positioned symmetrically on either side of the longitudinal plane of symmetry of the aircraft, each one having a leg 1 articulated around a lifting axis 5, and a swing bar 16 around a transverse axis 18. The swing bar 16 carries a wheel 21 pivotally mounted around an axis of rotation 19. The maneuvering of the undercarriage and the bracing thereof are insured by a bracing jack 13, and the deflections of swing-bar 16 are damped by a shock absorber 10. The leg 1 of the undercarriage has a first plane of symmetry (X,X) perpendicular to the lifting axis 5 and the longitudinal plane of symmetry of the aircraft and the swing-bar 16 has a second plane of symmetry (Y,Y) defined by the transverse axis 18 of the axis of rotation 19.

6 Claims, 2 Drawing Figures

U.S. Patent

Jan. 26, 1982

4,312,485

LANDING GEAR WITH SWING-BAR AND LATERAL LIFTING FOR AIRCRAFT

The subject of the invention is a main landing gear with swing-bar and lateral lifting for aircraft.

Many landing gears of this type are already known, having two undercarriages positioned symmetrically on either side of the longitudinal plane of symmetry of the aircraft, each undercarriage comprising a leg, articulated by one of its ends around a lifting axis to the structure of the aircraft, and at the other end of which there is articulated, around a transverse axis relative to the longitudinal plane of symmetry of the aircraft, a swing-bar on which at least one wheel is mounted pivotally around an axis of rotation, the maneuvering of the leg around the lifting axis together with the bracing of the leg in "gear extended" position being insured by a bracing jack, articulated on the one hand to the structure of the aircraft and on the other hand to the leg, and the deflections of the swing-bar bearing the wheel or wheels being damped by a shock absorber articulated on the one hand to the leg and on the other hand to the swing-bar.

Known landing gears of this type have the drawback of being constituted by two different undercarriages, the left undercarriage not being identical to the right undercarriage, because of the structure of the leg, in particular at the level of the end by which the leg is articulated to the aircraft, and the position on the leg of the attachments linking it to the jack and to the shock absorber, and likewise because of the structure of the swing-bar, in particular at the level of the end by which the latter is articulated to the leg, and the position on the swing-bar of the attachments linking it to the shock absorber. In consequence, the manufacture of such landing gears is expensive, since it is generally necessary to manufacture two types of leg, and, possibly, two types of swing-bar as well, the maintenance likewise being more expensive because the right and left-hand undercarriages are not interchangeable.

The present invention proposes to remedy these drawbacks by proposing a landing gear whereof the undercarriages, right and left, are constituted by identical elements.

With this in mind, the landing gear according to the invention is characterized in that the undercarriage leg has a plane of symmetry perpendicular to the lifting and to the longitudinal plane of the aircraft, and in that the swing-bar also has a plane of symmetry defined by the transverse axis of articulation of the swing-bar to the leg and the axis of rotation of the wheel or wheels on the swing bar.

The undercarriages are thus constituted by identical and interchangeable elements.

Moreover, on the leg of the undercarriage there is an axis perpendicular to the plane of symmetry of the leg, at one end of which the jack is articulated, and at the other end of which the shock absorber is articulated, so that interchangeability of the undercarriages will be obtained, at the level of the links of the leg with the jack and the shock absorber, by inverting the ends of the axis on which the jack and shock absorber are articulated, the said axis being advantageously borne on the outer face of the leg, relative to the longitudinal plane of symmetry of the aircraft, in "gear extended" position, in order to have good leverage, determined by the distance separating the lifting axis from the axis of the jack, in "gear retracted" position, in order to be able to easily insure the extension of the gear in the event that lifting is obtained by a 90° rotation of the leg around the lifting axis.

In a preferred form of the invention, the end by which the leg is articulated to the structure of the aircraft is constituted by a case of generally triangular shape articulated, around the lifting axis, by one of its bases, whereof each of the apexes is equipped with a pivot of articulation to the structure.

The swing-bar is advantageously inclined toward the outside of the aircraft, in "gear extended" position, relative to the longitudinal plane thereof, so that the part of the swing-bar bearing the wheel or wheels will be on the outside relative to the part by which the swing-bar is articulated to the leg, which makes it possible to fit the aircraft with wheels and tires of various sizes, depending on the terrains on which the aircraft is called on to travel.

And finally, the shock absorber is articulated to the swing-bar at the end, directed toward the longitudinal plane of symmetry of the aircraft, of an axis borne by the swing-bar, parallel to the axis of rotation of the wheel, whereof the other end is linked to a wheel-braking device.

Figure 1:
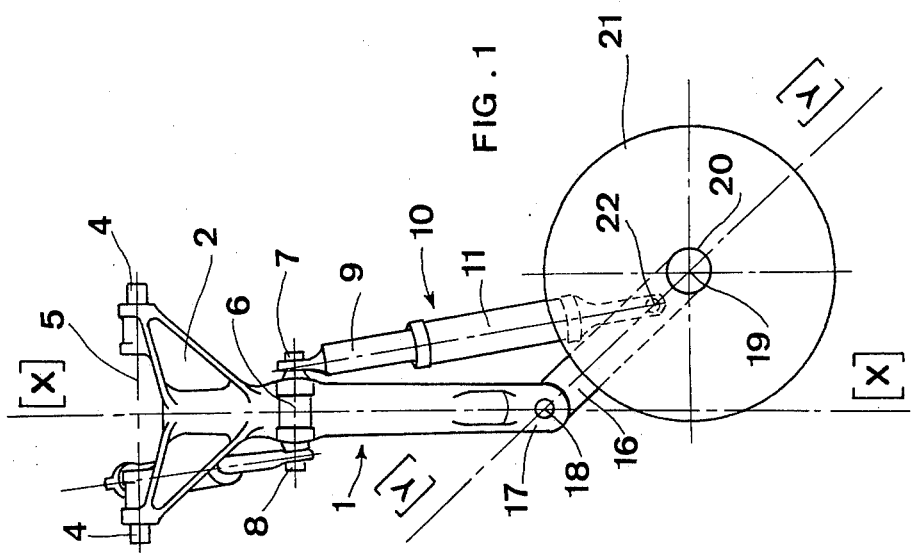

The present invention will be better understood with the aid of a particular example of a preferred embodiment described in a non-limiting fashion, with reference to the attached figures in which:

FIGS. 1 and 2 represent the left-hand undercarriage seen, respectively from the side and from the front, of the main landing gear with a swing-bar and lateral-lifting; the right-hand undercarriage being symmetrical and composed of identical parts.

Referring to these FIGS. 1 and 2, the left-hand undercarriage is constituted by a leg 1, whose structure has a plane of symmetry (X,X) perpendicular to the longitudinal plane of symmetry of the aircraft. One end of leg 1 is constituted by a girder 2 of generally triangular form, symmetrical on either side of the plane (X,X) and attached to the centeral part of leg 1 by one of its apexes, the base opposite this apex constituting the end of girder 2, which is articulated to the structure 3 of the aircraft by means of two pivots 4, likewise symmetrical to the plane (X,X), around a lifting axis 5 perpendicular to plane (X,X). The leg 1 of the aircraft undercarriage also has an axis 6, situated on the outer face of leg 1 relative to the left-hand longitudinal plane of the aircraft, this axis 6 being perpendicular to the plane of symmetry (X,X), and parallel to axis 5. On the two ends 7 and 8 of axis 6 there are articulated respectively, this shaft 9 of shock absorber 10, and shaft 12 of bracing jack 13, the ends of shafts 9 and 12 being retained on axis 6 symmetrically to plane (X,X). Cylinder 14 of jack 13 is articulated around a fixed point 15 on the structure of the aircraft by means of an axis, with the use of conventional known means.

The undercarriage also comprises a swing-bar 16, articulated by one of its ends around a transverse axis 18, retained in an asymmetrical fork 17 offered by the other end of leg 1, the center of the fork of articulation 17 being offset toward the outside of the aircraft relative to the longitudinal plane of symmetry of the latter, in such a way as to increase the track of the landing gear. At its other end, swing-bar 16 is equipped with a stub-axle 20 on which a wheel 21 is mounted pivotally around an axis of rotation 19.

The structure of swing-bar 16 also has a plane of symmetry (Y,Y) defined by transverse axis 18 and by the axis of rotation 19. Moreover, a third axis 22, parallel to axes 18 and 19, is borne by swing-bar 16 between the two axes 18 and 19, so that cylinder 11 of shock-absorber 10 is articulated at the end 24 of this axis 22 oriented toward the longitudinal plane of symmetry of the aircraft, while its other end 25 is attached to a braking device 23 received in the wheel 21.

Swing-bar 16 is inclined towards the outside of the aircraft, in "gear extended" position, so that the end of swing-bar 16 bearing wheel 21 will be on the outside relative to the end by which swing-bar 16 is articulated to leg 1; as a result, this arrangement of swing-bar 16 makes it possible to increase the track of the undercarriage and to equip the latter with wheels and tires of various sizes.

The transition of the landing gear from "gear extended" to "gear retracted" position is obtained in the following manner: With jack 13 being fed hydraulically, the shaft 12 of bracing jack 13 slides to the interior of cylinder 14, leg 1 is therefore entrained and pivots around its lifting axis 4, while jack 13 , (which) pivots around the fixed point 15 of the structure until shaft 12 of jack 13 is in the position of full retraction in the cylinder 14. In "gear retracted" position, leg 1 is lodged in a horizontal position in the fuselage or in a well in the fuselage of the aircraft, or even in a stub airfoil with which certain helicopeters are equipped.

The principal advantage offered by this landing gear is that it permits interchangeability of the undercarriages, or of elements constituting the undercarriages, such as leg 1 and swing-bar 16. As a matter of fact, the transition of these elements from the left-hand undercarriage to the right-hand undercarriage, or vice-versa, can be made without discrimination owing to the planes of symmetry (X,X) and (Y,Y) possessed respectively by the structure of leg 1 and by that of swing-bar 16.

To position the left-hand undercarriage under the right-hand part of the aircraft structure, it is merely necessary to disconnect rods 9 and 12, belonging respectively to shock absorber 10 and to jack 13, from the ends 7 and 8 of axis 6 of leg 1, then uncouple points 4 on the left-hand part of the structure, and reinstall the unit under the right-hand part of the structure after rotating the left-hand undercarriage 180° around the vertical axis (of leg 1) in such a way that wheel 21 will be on the outside relative to the longitudinal plane of symmetry of the aircraft, the pivots 4 being coupled to the structure 3 of the aircraft, then shaft 12 of jack 13 being articulated to end 7 of axis 6, and shaft 9 of shock absorber 10 to the end 8 of axis 6 on leg 1.

Likewise, if the left-hand swing-bar is to be mounted on the right-hand undercarriage. Cylinder 11 of shock absorber 10 is disconnected from end 24 of axis 22 born by swing-bar 16, and the latter is detached from leg 1 before axis 18 from fork 17 of leg 1. The unit constituted by swing-bar 16 and wheel 21 is disposed at the end of leg 1 of the right-hand undercarriage so that wheel 21, which was originally on the left and on the outside of the aircraft relative to the longitudinal plane of symmetry of the aircraft, will be on the right, and, once again on the outside of the aircraft, the swing-bar 16 then being reinstalled on leg 1 of the right-hand undercarriage by means of axis 18, and cylinder 11 of right-hand shock absorber 10 is articulated to the end 24 of axis 22 of swing-bar 16.

It may be noted that, when detaching rod 9 of shock absorber 10 from the end 7 of axis 6 on leg 1, instead of detaching cylinder 11 of shock absorber 10 from axis 22, it is likewise possible to carry shock absorber 10 with swing-bar 16 from one undercarriage to the other.

We claim:

1. A main landing gear for an aircraft having a longitudinal plane of symmetry, comprising:
    a leg having a first plane of symmetry perpendicular to the longitudinal plane of symmetry of the aircraft, said leg having at one end thereof two articulated points of connection to the aircraft disposed on opposite sides of the first plane of symmetry, and said leg having at its other end a first axis which is transverse to the first plane of symmetry;
    a swing bar having a second plane of symmetry and having one end articulated to said other end of said leg for rotation about said first axis, said swing bar having a second axis forming an axis of rotation, said second axis being parallel to said first axis and lying in said second plane of symmetry;
    rolling means mounted on said second axis; and
    a shock absorber having one end thereof connected with said swing bar at a point displaced from the two ends thereof and lying in said second plane of symmetry.

2. A main landing gear according to claim 1, wherein the other end of said shock absorber is articulated to said leg at a point which lies on an axis perpendicular to the first plane of symmetry.

3. A main landing gear according to claim 1, including
    a jack having one end articulated to said leg at a point which lies on an axis transverse to the first plane of symmetry, and wherein the other end of said shock absorber is articulated to said leg at another point thereon which lies on said transverse axis, said two last-mentioned points being symmetrical to said first plane of symmetry.

4. The main landing gear according to claim 2 wherein said jack has another end articulated to the aircraft.

5. The main landing gear according to claim 1, 2 or 3 wherein
    said leg at said one end thereof includes a girder of generally triangular form, said girder at one of its bases includes an articulation pivot for each of said two articulation points of connection to said aircraft.

6. The main landing gear according to claim 1, 2 or 3 wherein
    said swing bar is inclined towards the outside of the aircraft in "gear extended" position relative to the longitudinal plane of symmetry of the aircraft,
    the other end of said leg including an asymmetrical fork offset towards the outside of the aircraft relative to the longitudinal plane, said asymetrical fork together with the inclination of said swing bar provides for the fitting of the aircraft with wheels and tires of various sizes.

* * * * *